Dec. 21, 1943.  M. A. ELLIOTT  2,337,320
TUBE FITTING PACKAGING UNIT
Filed Dec. 21, 1942

Inventor
MORRIS AUBREY ELLIOTT.
By Howard J. Whelan.
Attorney

Patented Dec. 21, 1943

2,337,320

UNITED STATES PATENT OFFICE 2,337,320

TUBE FITTING PACKAGING UNIT

Morris Aubrey Elliott, Baltimore, Md.

Application December 21, 1942, Serial No. 469,603

3 Claims. (Cl. 138—89)

This invention refers to piping and more particularly to plugs for the ends of same to protect screw threads and prevent grit and dirt from entering same and serve as an arrangement to substitute for packaging. It has among its objects to provide a plug or stopper that can be placed in a pipe or tube union unit and hold itself in place and serve as a package means; to have its structure of a form that will facilitate its introduction into the pipe end unit and its attachment thereto. Another object is to have the form of the article suitable for manipulation and use with a tool that will speed up its operation and increase the efficiency of the labor required, to put it in place. A further object is to provide a device of this nature that can be used for use with new pipe union units having different screw threads, without modification of the stopper intended for each particular threading of piping; in other words to provide a type of universal plug suitable for the size of pipe selected, regardless of the screw threading thereon. Other objects include the treatment of the plug so it will not be materially affected by changes of temperature, humidity and other atmospheric conditions met with in general experience in the use of same. Also to have the plug available for repeated use even though the screw-threading of the piping unit may vary, while holding its internal diameter. A still further object is to have the plug or stopper afford substantial capacity for hard usage and protection of the screw threaded end portions and tubing of the piping unit. A main purpose of this invention is to have a device that will afford means for protecting the pipe ends and connections, that will enable them to be transported or stored without further packaging and cumbersome packing that would otherwise be required.

Other objects will become apparent as the invention is more fully set forth.

The packaging systems used generally for pipe ends and union attachments for same are of various types and for different functions and fit into containers and filling is required and take up considerable space, time and expense. Plugs have been used mainly to "stop" the piping and are frequently of metal or other hard material. They have little flexibility for adjustment or change to meet varied conditions in the screw threads or structure of the pipe. They are also limited in function and arranged to close the end of the piping for one use only, and are discarded when they are taken off. In this invention, the device is like a stopper and made of light flexible material such as wood or plastic, and formed to be self centering, with the capacity of taking on the form of the screw-threads or other shape of the pipe union units it is put on. In addition a suitable slot is provided in the head of this new stopper to enable it to be placed on a key tool, mounted on a table, for aligning purposes, then forced into place by pressure on the pipe unit, giving it a slight twist to make the screw threads on the pipe union cut themselves into the stopper and hold it in place. This places the plug securely in place and tight against the pipe end fitting to prevent the ingress of grit, lint, and perhaps water. It is removed just as easily. As the material is relatively soft, it can be readily reused in additional pipe ends. It can have new screw threads recut over the old threads if the new pipe should have same and require it, by the mere rotation of the plug. When it is used, it becomes an apparent part of the unit and piping, and eliminates the need for an outside container and inside filling to prevent damage to its working portions. This also serves to reduce the expense and time of packaging.

In the drawing which illustrates an embodiment of this invention:

Similar reference characters refer to similar parts throughout the drawing.

Figures 1, 2:
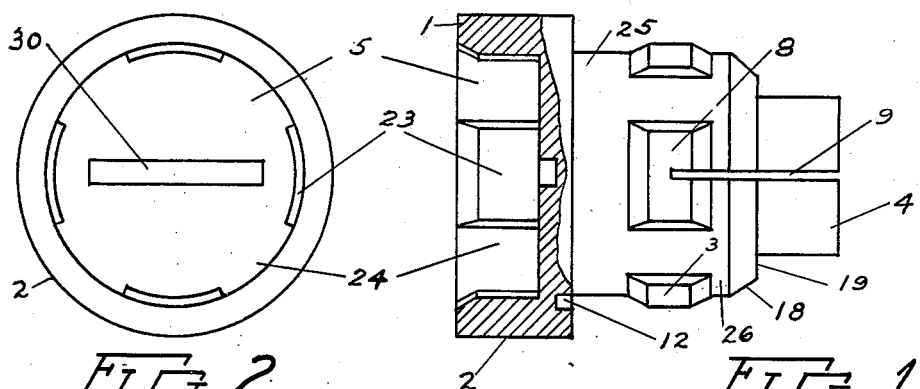
Figure 1 is a side elevation of the device embodying this invention partly in section.
Figure 2 is an end elevation of Figure 1 showing the pipe element.
Figure 4:
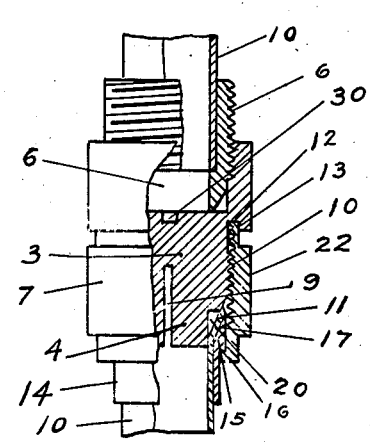
Figure 4 shows the unit assembled in the pipe and couplings with parts broken away to show the interior construction.
Figure 5:
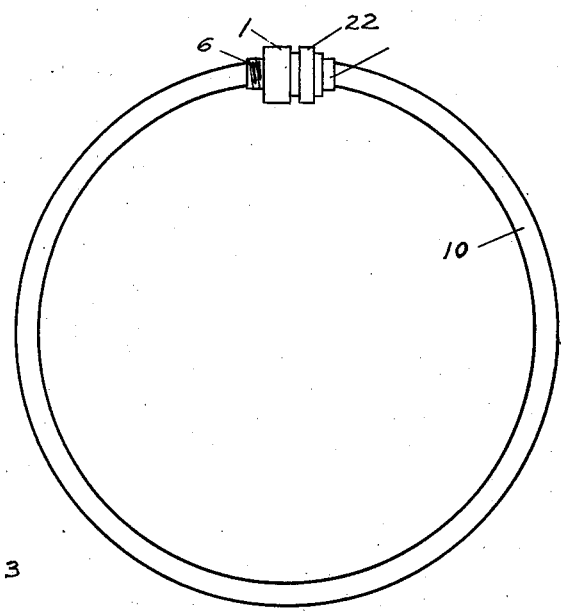
Figure 5 shows the unit, couplings and pipe assembled for transportation.
Figure 3:
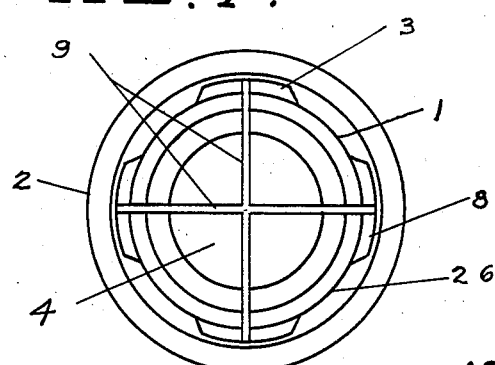
Figure 3 is an end elevation of Figure 1 looking in the direction of the pipe insertion element.

In the drawing, the device is indicated as a stopper-like unit 1. The device is in several sections known as the cap element 2, the body 3 and the pipe insertion element 4. It is preferably made of wood or plastic. The cap element is circular in form, reasonably thick and formed with a sunken or slotted depression 5 adapted for holding the male end portion 6 of a tubing union 22 that is screw-threadably inserted in it. This slotted depression is also arranged to take a tool suitable for forcing the unit 1 by rotation to disengage from the female portion 7 of the union. The body element is tapered similarly to the general taper of a screw thread. Its peripheral surface is surmounted with four or more raised surfaces 8 having a thickness about that equal to the depth of a screw thread. When this portion of the device is inserted into the internally threaded portion 10 of the union part 7 and rotated, it cuts screw threads on these raised surface portions 8 due to the tapping action of the screw threads of the union thereon. This arrangement facilitates the work and is effective enough in holding the body and union together to suit all practical requirements. The pipe insertion element 4 is cut at 9 to provide deep slots or separations in the same and extending partially into the body 3. This permits a resilient action in the element 4 and the body 3 that assists in the attachment of the device to the union. It also eliminates the possibility of splitting in the stopper due to expansion reactions in the stopper or union. The element 4 is preferably cylindrical in form and adapted to fit the flexible tubing 10 to which the union sleeve 7 is attached by the use of the swaged end 11. The element 4 serves as an aligner to guide the device properly on to the union parts and prevent the cross threading of the screw-threads on the surfaces 8.

The cap has an undercut slot 12 for the end 13 of the female portion of the union to run into and be covered by. The cap is also provided with projections 23 and slots 24 to facilitate its threading to suit the male end portion 6 of the union.

The swaged end 11 is peripherally mounted with a hollow cylindrical thimble 14 having a rim 15. The rim 15 is engaged by the lip 16 on the union sleeve 7 and caused to press on the swaged external surface 17 and made tight against the bevelled surface 18 provided at the lower portion of the body adjacent to the element 4. A sufficient shoulder 19 is arranged in the form of the body to allow a space 20 to be provided when the swaged end is under pressure. The purpose of this shoulder and space is to take care of inequalities in the tubing and variations in sizes. It prevents binding and has other practical advantages. The body 3 is comprised of a rounded portion 25 upon which are mounted raised surface portions 8 which receive the thread impressions as the sleeve is tightened thereon. The front portion 26 or shoulder of the rounded portion 25 acts as a guide to properly position the female portion of the sleeve on the raised surfaces 8. The depression slot 30 in the cap affords capacity for inclosing any compound that will be absorbed by the same to prevent it cracking or splitting under atmospheric conditions, and provides means for turning the plug.

The operation of the device in combination with a connection having a flexible tubing 10 and the union parts 6 and 7 of the union 22, is to place the cap element on the part 6, and tighten them together. The pipe insertion element 4 is placed in the other end of the tubing and the sleeve 7 screwed on to the tapered raised surfaces 8 of the body 3, with the undercut slot 12 closing over the end 13 of the female portion off the union. The tubing is therefore closed internally and externally by the stopper and cap. This makes the closure of the tubing complete and free from loose ends. It makes a complete cycle of attachment. Of course the male end 6 can be screw-threaded into the cap first and the union sleeve screwed onto the stopper later, rather than the previous manner described. This is a matter of convenience depending on the needs of the user. When the connection is so looped it is ready for shipment, and being relatively safe in that form requires no further external packaging or filling. The detachment of the parts of the union to allow the connection to be fastened to a machine or equipment is simply done. The parts 6 and 7 are removed from the stopper unit and their free ends connected up.

It can be noted that the insertion element fills the bore of the tubing and prevents its being crushed at that end, and offers such resistance to the tightening of the sleeve 7, and the drawing of the thimble 14, that it becomes tight. The cross cuts in the element 4 are resilient enough to take up any tendency to crush the tubing and prevent damage to it, as well as increase the tightness. The unit protects the tubing and union from ingress of dirt and perhaps liquids; it covers and protects the swaged end of the tubing; it keeps the screw threads of the union clean and covered; it gives the connection a convenient form for handling and transportation, and provides other incidental advantages.

While but one general form of the structure for the invention is indicated in the drawing and described generally in the specifications, it is not desired to limit this application for patent to such particular form or in any other way otherwise than limited by the scope thereof, as it is appreciated that other forms of construction could be made that would use the same principles and come within the scope of the appended claims. Having thus described the invention what is claimed is:

1. A packaging unit of the class described comprising in combination, a cap element, a body portion connected with the said cap element, said body portion having raised thread contact surfaces mounted on the peripheral surface thereof, a collar attached to said body portion for guiding thread forming means to said thread contact surfaces, an angular face attached to said collar, a pipe insertion element for insertion into the swaged end portion of tube for guiding the body element of the union sleeve and maintaining the formed contour of said swaged end, said insertion element being split to resiliently bind within the pipe aforesaid.

2. In combination with a swaged pipe end with union connection, a stopper unit comprising a cap having a slot formed therein for engagement and aligning with the end portion of the connection, a body portion attached to the cap and insertable in the union so as to be screw-threadably cut thereby and screwed thereon to bring the cap securely against the same, and a pipe insertion element for insertion in the swaged end portion for guiding the body element to the union and maintaining the formed contour of the said swaged end.

3. In combination with a swaged pipe end with union connection, a stopper unit comprising a cap having a slot formed therein for engagement and aligning with the end portion of the connection, a body portion attached to the cap and insertable in the union so as to be screw-threadably cut thereby and screwed thereon to bring the cap securely against the same, a pipe insertion element for insertion in the swaged end portion for guiding the body element to the union and maintaining the formed contour of the said swaged end, said insertion element being split across to resiliently bind within the pipe aforesaid, and means for facilitating the reactions on the swaged end and binding it to the body element as the union sleeve is screwed thereon.

MORRIS AUBREY ELLIOTT.